(12) United States Patent
Ebling et al.

(10) Patent No.: US 8,494,928 B2
(45) Date of Patent: Jul. 23, 2013

(54) METHODS AND APPARATUS FOR COMPLEMENTING USER ENTRIES ASSOCIATED WITH EVENTS OF INTEREST THROUGH CONTEXT

(75) Inventors: Maria Rene Ebling, White Plains, NY (US); Edith Helen Stern, Yorktown Heights, NY (US); Pnina Vortman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 12/114,324

(22) Filed: May 2, 2008

(65) Prior Publication Data

US 2008/0228609 A1    Sep. 18, 2008

Related U.S. Application Data

(63) Continuation of application No. 10/782,236, filed on Feb. 19, 2004, now abandoned.

(51) Int. Cl.
*G07B 17/00* (2006.01)
*G06Q 40/00* (2012.01)
(52) U.S. Cl.
CPC ..................................... *G06Q 40/10* (2013.01)
USPC .............................................. 705/30; 705/2
(58) Field of Classification Search
CPC ......... G06Q 50/22; G06Q 40/10; G06F 19/327
USPC .............. 707/104.1; 709/108, 217; 715/507; 704/4; 705/30
See application file for complete search history.

(56) References Cited

U.S. PATENT DOCUMENTS

| | | | |
|---|---|---|---|
| 5,704,029 A | 12/1997 | Wright, Jr. | |
| 6,658,622 B1 * | 12/2003 | Aiken et al. | 715/210 |
| 7,110,955 B1 * | 9/2006 | Barhnart et al. | 705/3 |
| 2002/0115444 A1 | 8/2002 | Yu et al. | |
| 2003/0018692 A1 | 1/2003 | Ebling et al. | |
| 2009/0204642 A1 * | 8/2009 | Gliklich | 707/104.1 |

OTHER PUBLICATIONS

U.S. Appl. No. 09/583,318, filed May 30, 2000, Stern et al.

* cited by examiner

*Primary Examiner* — Ryan Zeender
*Assistant Examiner* — Hunter Wilder
(74) *Attorney, Agent, or Firm* — Anne V. Dougherty; Ryan, Mason & Lewis, LLP (57) ABSTRACT

Data validation techniques are provided. For example, such techniques complement user entries associated with events of interest through context. In one aspect of the invention, a technique for processing one or more user entries associated with one or more events of interest includes the following steps/operations. Context associated with the one or more events of interest is obtained. At least a portion of the obtained context is associated with one or more user entries representing events of interest. At least a portion of the one or more user entries is evaluated, responsive to at least a portion of the context. An indication of the one or more events of interest is provided, responsive to the evaluation.

17 Claims, 4 Drawing Sheets

METHODS AND APPARATUS FOR COMPLEMENTING USER ENTRIES ASSOCIATED WITH EVENTS OF INTEREST THROUGH CONTEXT

CROSS-REFERENCE TO RELATED APPLICATION(S)

This application is a continuation of U.S. application Ser. No. 10/782,236 filed on Feb. 19, 2004, the disclosure of which is incorporated herein by reference.

FIELD OF THE INVENTION

The present invention relates to data validation through evaluated context and, more particularly, to methods and apparatus for complementing user entries associated with events of interest through context.

BACKGROUND OF THE INVENTION

Many applications, including applications associated with billing and expenses, rely on user entry for detail. However, users are not always complete and accurate in the entries that they make. In an attempt to remedy this, pervasive computing applications abound that allow point-of-event entry for these applications so that required entries are fresh in the user's mind, and entered data is more accurate and complete. This does not prevent lost entries, such as charges which are lost as people forget to report on lab tests or encounters with medical staff.

Examples of such applications include personal digital assistant (PDA) based expense accounts and products such as "Patient Keeper Charge Capture" available from Patient Keeper, Inc. of Brighton, Mass.

In specific applications, the time of reporting a specific occurrence can impact the cost and payments exchange between businesses. There are two types of existing billing systems:

(1) Real-time billing systems—These are billing systems where the payment is performed immediately at the time when the service is performed or goods are being purchased. Examples of a few types of real-time payment systems include: pre-paid phone cards; cash payments (e.g., to supermarkets, to physicians, for work, etc.); electronic wallet (e.g., smart cards) where money transactions are being exchanged; and parking tickets where exit point payment is required.

(2) Periodic billing systems—These are billing systems where the payment is being processed periodically at a later point in time to the time the service or goods were provided. Most billing systems work in this mode. In those cases, the transaction is fed into the system either manually or semi-manually. Examples of a few types of such payment systems include: regular phone bills, utility bills, healthcare insurance bills, expense accounts, police tickets, and ordering goods via phone or facsimile.

In all the above cases, the quality of the data entered manually depends on human ability to listen and see accurate information, as well as to type accurately. It is clear that errors can always occur as a result of human mistakes. Moreover, even in cases where systems can perform data cleansing and overcome some mistakes, timing can have an additional impact. Another example where timing can have significant impact on billing is related to hospitalization. Insurance companies have special controllers in hospitals that validate the time and reasons for hospitalization. Often today, the controllers must go back to their offices to report on hospitalization of their insured customers, and thus information is usually delayed by 24 hours. The temporal characteristic of the reporting event is critical to the cost calculation.

Filling in forms on the World Wide Web (e.g., using a personal computer) can be advantageous since logic programs can verify and check whether the form is filled in a reasonable manner. However, Web access is not always available, nor is simple verification sufficient for identifying all errors (especially errors of omission). Techniques in filling out electronic forms are well known and disclosed, for example, in U.S. Pat. No. 5,704,029 issued Dec. 30, 1997 to G. V. Wright, Jr., and entitled "System and Method for Completing an Electronic Form."

Techniques to enhance form completion are also known in the art. For example, "cookies" are used to allow forms to be filled in on the Web with minimal additional data entry. Use of such cookies allows various techniques, such as prefix matching and attribute value pairs, in order to determine what data goes into what field.

Form filling can also be enhanced with location-based knowledge. For example, the U.S. patent application identified by U.S. Ser. No. 09/583,318, filed on May 20, 2000, and entitled "Method and System for Increasing Ease-of-Use and Bandwidth Utilization in Wireless Devices," discloses using location to help determine entries a user may be trying to make on a wireless device (e.g., filling in a uniform resource locator (URL) with car price research sites when the user is standing in a used car lot).

Thus, in summary, data entry is often erroneous and subject to human error (e.g., incorrect information entry, partially incorrect information entry, failure to make an information entry). Whether paper or electronic, user error is responsible for many incorrect data records. What is needed is a technique for supplementing user entry with a validation data stream.

SUMMARY OF THE INVENTION

The present invention provides data validation techniques. For example, such techniques complement user entries associated with events of interest through context.

In one aspect of the invention, a technique for processing one or more user entries associated with one or more events of interest includes the following steps/operations. Context associated with the one or more events of interest is obtained. At least a portion of the obtained context is associated with one or more user entries representing events of interest. At least a portion of the one or more user entries is evaluated, responsive to at least a portion of the context. An indication of the one or more events of interest is provided, responsive to the evaluation.

The technique may further include obtaining a specification of context associated with one or more events of interest. Further, the technique may include specifying the one or more events of interest. Context specified may include a location, a time at location, a proximity to a location, a proximity to a person, a proximity to a device, a proximity to a person satisfying a condition, a proximity to a location during a specified time interval, an application invocation, a duration of an application invocation, a duration of an application focus on a particular subject, an application invocation during a specified time interval, a user input, a duration of a user input session, a proximity to multiple persons and a location, a calendar, a work assignment, and/or a workflow stage. A location may include a physical location. Further, the technique may include mapping a physical location onto a logical location. Still further, a proximity may be determined in accordance with an identification device.

Context may be obtained through a computer program, a file transfer, a batch mode, a communications network, a communications-enabled device, and/or a polling mechanism. Context may be obtained from one or more sources. Further, context may be obtained from a calendar, a global positioning system, user entry, a video, a sensor associated with a person, a sensor not associated with a person, and/or a proximity to a wireless access point.

The step/operation of associating context may be responsive to a time of day, a time of event of interest, a location of event of interest, a location of entity, a source of context, and/or an entity associated with context. The step/operation of evaluating the one or more user entries responsive to context may include a determination of validity, a determination of a likelihood of validity, a determination of a missing entry, and/or a determination of a missing element of an entry. A defined workflow of correlated events may exist and the associated context may use a position in the workflow for determination. The step/operation of providing an indication may include a log, an error message, a warning, a default entry, an amended entry, a new entry, a deleted entry, a workflow, an e-mail, and/or a notification. Evaluation may include the step/operation of, responsive to at least two sources of context, creating a composed source of context. The composed source may be created through a calculation.

In another aspect of the invention, a technique for validating one or more expenses based on context data includes the following steps/operations. Context data is obtained in the form of a location history for at least one user. Responsive to user entry of one or more expenses incurred, a location associated with an expense is determined. The user location history is reconciled with the location associated with the expense. An indication of the reconciliation is provided. The technique may also include obtaining location history for at least one device.

In a further aspect of the invention, a technique for validating a charge based on context data includes the following steps/operations. Context data is obtained in the form of a charge history for at least one client. One or more current charges for the client are compared to one or more previous charges for the client. The technique may also include comparing the one or more current charges for the client to previous, similar charges for other clients.

In yet another aspect of the invention, a technique for validating a charge based on context data includes the following steps/operations. Context data is obtained in the form of a charge history for at least one employee. A current charge for a client of the employee is compared to one or more previous charges originating from the employee for the client. The current charge for the client of the employee is compared to the previous charges originating from the employee for all clients.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

It is to be understood that while the present invention will be described below in the context of a medical services billing environment, the invention is not so limited. Rather, the invention is more generally applicable to any environment in which it would be desirable to provide techniques for validating user data entries based on context. As used herein, the term "context" is generally understood to refer to information about the physical or virtual environment of the user and/or the computational device being used by the user.

In accordance with principles of the invention, it is realized that with context middleware, and sources of context such as location, it is possible to complement user entries with context-based knowledge in order to improve the quality of those entries. Principles of the present invention use context middleware to enable easy recording of context streams, and later reconciliation of, and validation with, user entries. This may result in an indication of support of the user entry, may indicate possible errors in user entries, or may point out the absence of a user entry where one may be desirable.

In the case of a hospital clinical care scenario, often charges for physician visits are not levied on the patient, or may be levied mistakenly without the physician visiting the patient. Charges for medication, x-rays and so on may contain similar errors.

In accordance with principles of the invention, events of interest are defined as associated with context (e.g., location), or a composition of contexts (e.g., physician proximity to a patient in a patient room, medication cart proximity to a patient). The context collected may also include time on task (the amount of time spent in a patient room or the amount of time spent writing up notes about the visit). The context associated with these events of interest is received and logged, and is later reconciled with billing entries. These billing entries may be made by the physician, by the nurse, by the administrator, etc.

The reconciliation may suggest that an entry is invalid, may suggest that entries are contradictory, or may suggest that entries are missing. Responses to these suggestions may be dependent upon the application, policy, or both. However, some general examples of responses may include prompting of a user to re-enter (or enter for the first time) data, automatically correcting the faulty (or missing) entry based on some pre-established policy, alerting someone other than the user that data is faulty or missing.

The business value is clear; hospitals (or, more generally, billing entities) may achieve more accurate billing. Expense accounts in an enterprise may be reconciled with location (with appropriate privacy guarantees of course). Other applications may include validation of service billings (e.g., repairmen or lawyers), validation of charge card purchases, and indication of identity theft, to name a few. That is, it is realized that today charge card companies and telephone companies look for unusual patterns to determine theft likelihood (e.g., sudden charges in South America), but they cannot discover if reasonable charges are wrong (e.g., a credit card charge for the purchase of gas in New Jersey for a Westchester resident). However, in accordance with the teachings of the present invention, using context as a complementary tool can allow this to occur.

Note that incomplete context coverage (e.g., not able to get location information at all places) may still result in value, as long as context coverage appropriate to the events of interest is available. For example, radio frequency identifier (RFID) tags may be used to identify patients, and readers may be located at the entrance to magnetic resonance imaging (MRI) rooms, x-rays, etc. This provides some assistance in reconciliation of data, and return value with minimum capital expenditure. Further, adoption of RFIDs attached to mobile devices like mobile MRI or attached to drug containers provides additional business value such as the ability to locate and trace "stolen" entities. This has impact on the cost and expenses of healthcare organizations, retail store, container of goods, etc. In some cases, it can shift company balance sheets from debit to credit. In addition, by tracking the movement of those entities, it may be possible to identify their destination. Smartcards are already vastly in use in some locations within the healthcare industry; patients identify themselves to physicians, labs, radiology centers using their smart cards. The information provided is used to complement the context in a clinical event accurately and prevent errors in patient identification and patient demographic information.

Extending the clinical events with context streams can be performed incrementally. In the example of the RFID based location awareness above, a facility may gradually install more RFID readers, and gain incremental value as the ability to identify location and proximity increases. Another feature of the invention is the ability to use different context sources. For example, location may be determined using RFID as above for patients and by wireless proximity to a Bluetooth node for physicians carrying Bluetooth enabled devices (see, e.g., U.S. Ser. No. 09/784,975, filed on Feb. 16, 2001, and entitled "Systems and Methods wherein a Base Device Facilitates a Determination of a Location Associated with an Occurrence of an Event").

Another feature of the invention relates to the use of logical locations. As an example, hospital location information can be mapped from specific coordinates onto logical locations, such as room numbers or room functions. For example, "operating room" may be mapped to multiple coordinates representing multiple rooms. This allows entries containing the logical location to be more meaningful to users of the system, both in the specification of an event of interest and in later data entry or validation by individual users.

Another key feature of the invention is the ability to associate events in different points of the process that may be in different locations generated by different users or systems, so that it is possible to correlate them later on and identify missing information. For example, when an order is being placed for a lab test, an event is being generated and can be correlated with the event generated when the lab results are issued.

Figure 1:
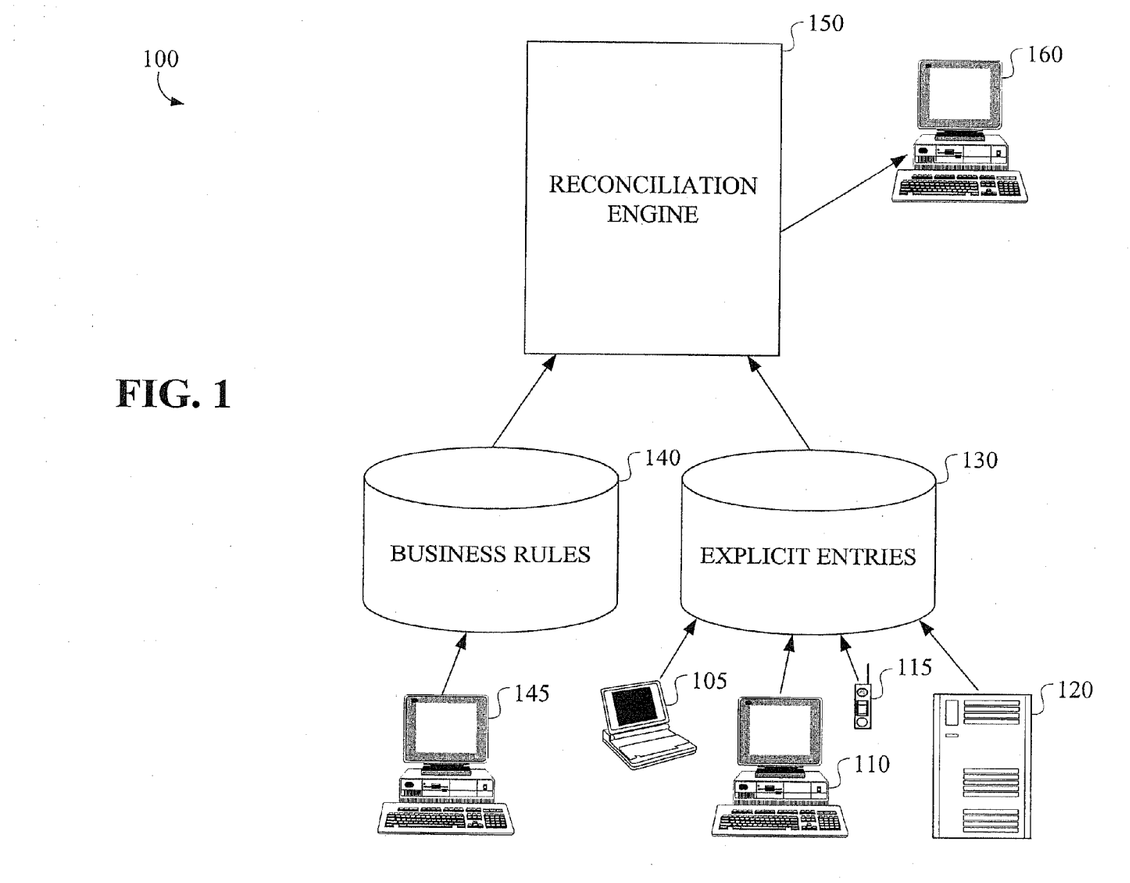
FIG. 1 is a block diagram illustrating an existing user data entry system.

Referring initially to FIG. 1, a block diagram illustrates an existing user data entry system that employs explicit data validation. As shown, user entry system 100 receives explicit input from, for example, users or business processes through a variety of devices such as mobile computers 105, desktop computers 110, personal digital assistant or cellular phone devices 115 and backend systems 120. This explicit input is stored in a data store 130, which could be a database, flat file, or other data storage subsystem.

Once available, the explicit input stored in 130 can be processed by a reconciliation engine 150 according to one or more business rules stored in data store 140, such as meal and hotel limits or requirements to use the lowest price airfare. It is to be appreciated that the business rules may be entered and/or created via computer system 145, while results of the reconciliation engine 150 may be provided to computer system 160.

The reconciliation engine 150 may verify that users have met the business rules. If so, the system may approve the explicit data. Otherwise, the system may take any of a number of actions with the explicit data together with the business rule that the explicit data violates. These actions include presenting the relevant data to the user who entered the explicit data for further verification or to a different user (e.g., a manager or auditor) for independent verification.

The system depicted in FIG. 1 suffers from a number of problems. One such problem is that the system can require unnecessary verification. Another is that the system cannot detect complex violations that could be detected with the addition of context information. In accordance with FIG. 2, an embodiment of a user data entry system according to the invention, which addresses these and other problems, is described.

Figure 2:
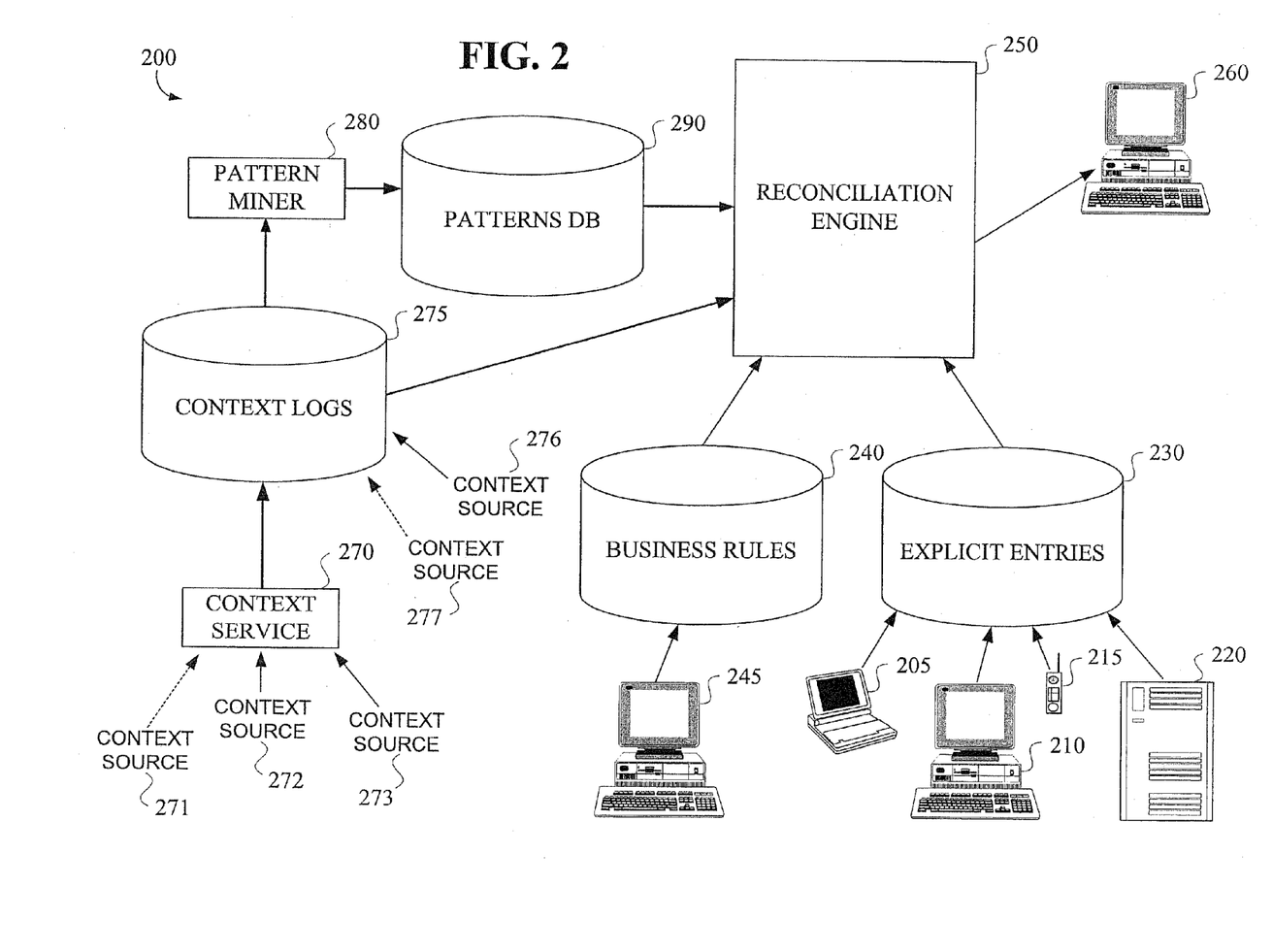
FIG. 2 is a block diagram illustrating a user data entry system, according to an embodiment of the present invention.

Referring now to FIG. 2, a block diagram illustrates a user data entry system, according to an embodiment of the present invention. User data entry system 200 uses explicit entry provided by, for example, users or business processes through a variety of devices such as mobile computers 205, desktop computers 210, personal digital assistant or cellular phone devices 215 and backend systems 220. In addition, the explicit data provided by these sources is stored in an explicit entry data store 230. Further, business logic specifications (i.e., business rules) are stored in data store 240. The data store 240 could be a database system, a flat file, or any of a variety of other data stores. Computer system 245 may be used to enter and/or create business rules.

System 200 also has a reconciliation engine 250. Once anomalies are identified, they are presented to a user in one or more forms, such as an error message or a query or a request for confirmation. Such results may be provided to computer system 260. The reconciliation engine 250 uses the explicit data stored in the explicit entry data store 230 together with the business logic specifications stored in the business rules store 240. However, unlike reconciliation engine 150 (FIG. 1), reconciliation engine 250 also uses context information, stored in a context log 275, and patterns based on that context, stored in a patterns database 290.

The context information is obtained via a variety of sources, such as 271, 272, 273, 276, and 277. These sources may be connected sources (denoted with solid lines), such as 272, 273, and 276, or occasionally connected sources (denoted with dashed lines), such as 271 and 277, that collect context during periods of disconnection and report that collected context once connectivity has been reestablished. For example, a PDA in a hospital may collect data entered by a physician or collected from the environment (e.g., an RFID reader). The PDA would operate disconnected from the network while in the hospital, but would reconnect to the network once the physician reached an environment where wireless communications are safe or where the device may be physically connected via a desktop or a wired network connection. Context may arrive to the system via a context service 270 and be forwarded to a data store (e.g., the context log 275). Alternatively, context may arrive to the system directly via the context log 275. Regardless of how context arrives, reconciliation engine 250 uses this context in a user data entry validation methodology illustrated in accordance with FIG. 3 and described below.

Further, patterns of context data are observed in the context log 275 by a pattern miner 280. Once observed, the pattern miner 280 stores the pattern in a pattern database 290 for use by reconciliation engine 250. Data and pattern mining tools are well known in the art, and used to shield users from unwieldy bodies of data by analyzing the data, summarizing it, or drawing conclusions from the data that the user can understand. For example, one known computer software data mining product is IBM Corporation's "Intelligent Miner" which is operable in several computing environments including AIX, AS/400, OS/390, Windows NT, and Windows 2000, and Solaris. The IBM Intelligent Miner is an enterprise data mining tool, designed for client/server configurations and optimized to mine very large data sets, such as gigabyte data sets. The IBM Intelligent Miner includes a plurality of data mining techniques or tools, used to analyze large databases and provides visualization tools used to view and interpret the different mining results. Examples of other data mining techniques that may be employed are disclosed in U.S. Ser. No. 10/198,283, filed on Jul. 18, 2002, and entitled "Method and Apparatus for Providing Flexible and Scalable Context Service."

Figure 3:
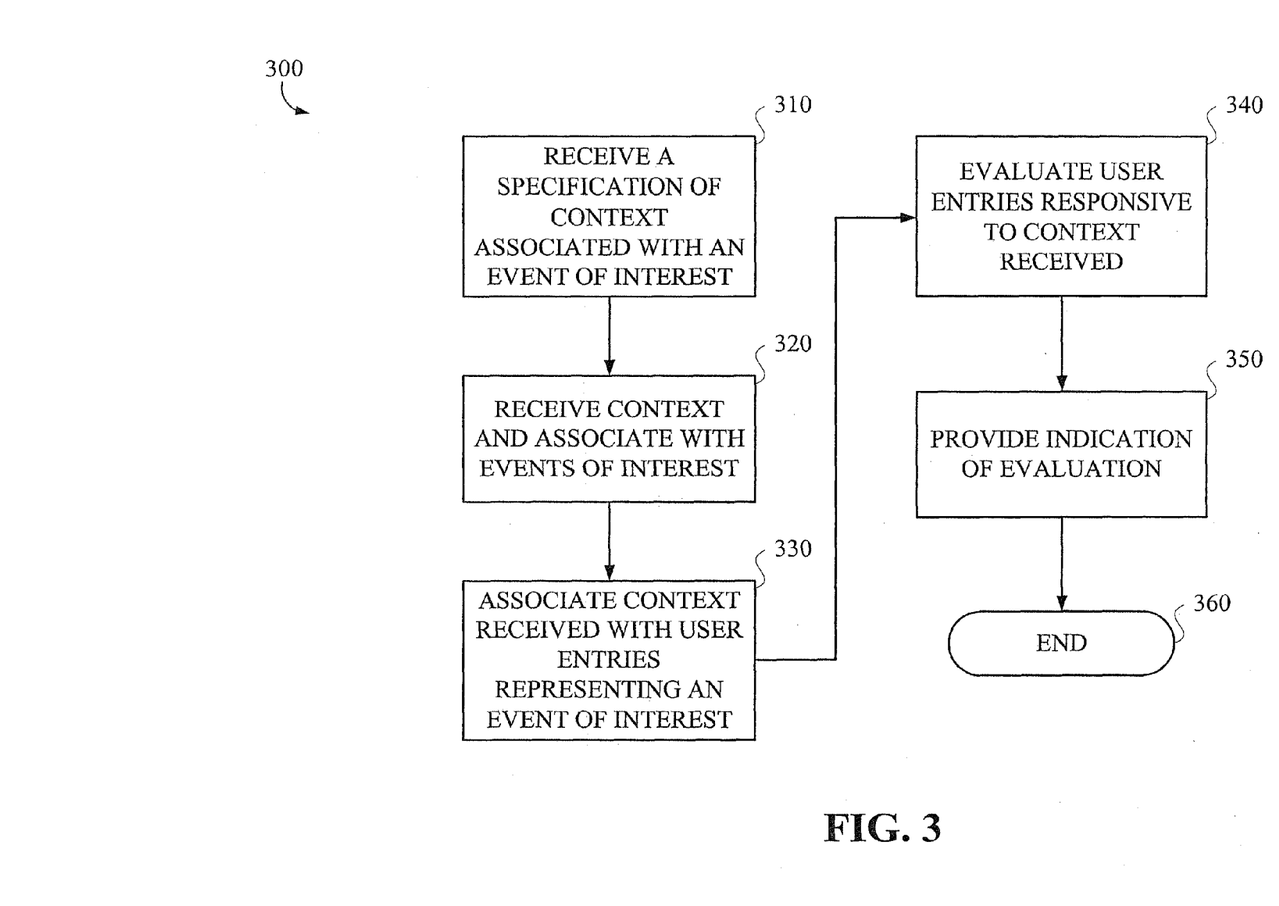
FIG. 3 is a flow diagram illustrating a user data entry validation methodology, according to an embodiment of the present invention.

Referring now to FIG. 3, a flow diagram illustrates a user data entry validation methodology, according to an embodiment of the present invention. To further illustrate this reconciliation methodology 300, a hospital charging example is considered. An event of interest may be a patient's proximity to an MRI, x-ray, or primary physician.

Methodology 300 begins at step 310 wherein a specification of context associated with an event of interest is received. In one illustrative embodiment, the specification is made by selecting at least one context source from available context sources (e.g., via menus or pull downs), specifying a range of values for the context source, and specifying the relationship between these sources. The ranges may be numerical (e.g., temperature between 98.6 and 100 degrees), or may themselves be a collection of possible states (e.g., in one of several operating rooms).

The relationships may be logical (e.g., AND, OR, XOR) or may be composed of these logical relationships (e.g., Context A in range X AND Context B in range Y, when Context C is "delayed during office hours"). Further these relationships may be described by other terms (e.g., proximate, equal to Z). Note that context sources may be composed to provide more complex context (e.g., busy, rather than on-the-phone, or in-a-meeting, or in-the-operating room, or with-a-patient).

Other embodiments may include modifying a specification template to create a new specification, providing an indication of existing templates, accessing a template from a supplier of templates (e.g., from a Web source). In our example, the context sources are patient location and physician location. We assume that MRI and x-ray locations are known and constant. If they are mobile devices, then their location is also a context source.

It is to be appreciated that the context being specified depends on the data entry environment. However, some general examples of specified context may include a location, a time at location, a proximity to a location, a proximity to a person, a proximity to a device, a proximity to a person satisfying a condition, a proximity to a location during a specified time interval, an application invocation, a duration of an application invocation, a duration of an application focus on a particular subject, an application invocation during a specified time interval, a user input, a duration of a user input session, a proximity to multiple persons and a location, data from an electronic calendar or scheduling program, a work assignment, and/or a workflow stage. It is to be further appreciated that proximity may be determined in accordance with an identification device (e.g., device ID, RFID) and may also be determined in accordance with an event type and/or a service identifier Further, it is to be appreciated that events of interest may be specified in a manner similar to or different from the manner in which context is specified.

Methodology 300 continues in step 320, which operationalizes the specification. In step 320, context is received and associated with the events of interest. Context may be received from entities and devices such as, but not limited to: sensors (connected wirelessly or wired) that may be associated with a person or not associated with a person; a calendar program, location technology such as a global positioning system (GPS); a wireless access point; a RFID tag; an active badge; information technology (IT) components which may include themselves calendars and reservation schedules. Context may be received in real-time, near real-time, or batch mode (e.g., accumulate context data and transfer accumulated context data at a later time).

Thus, it is to be appreciated that, in general, context may be received through a computer program, a file transfer, a batch mode, a communications network (e.g., Ethernet 802.11, Bluetooth, cellular wide area network (WAN), Internet, etc.), a communications-enabled device (e.g., RFID tag), and a polling mechanism. Context may be received from a single source or from more than one source. Context may also be received from user entry and/or a video. Again, it is to be understood that the type of context and how it is received depends on the data entry environment.

Further, in step 320, context received is then examined in conjunction with the specification of step 320. In our example, patient location is examined in conjunction with known locations of MRI and x-rays, and with dynamic locations of physicians. When the context or composed context matches the specification, an indication of the match is provided. In an illustrative embodiment, the indication includes reference to time of day, location, and/or other available data.

Further, in one illustrative embodiment, step 320 employs context logs which contain historical context. For example, location context may be collected by a device such as a GPS-enabled PDA. The log of such location context may be periodically transmitted to be used in step 320. Alternately, location context may be collected by a third party such as a cellular carrier and made available on a demand or on a periodic basis. An example of one application employing such historical logs can be found in validation of charges associated with client visits. Historical location context associated with an employee may be compared to historical location context associated with a client, and charges for customer calls validated against determination of proximity of the employee to the client.

In step 330, methodology 300 associates context received and examined in step 320 with user entries representing events of interest associated with the specification of 310. In our example, patient charges entered by an administrator or hospital IT process or program are associated with the context stream of step 320. Charges may be associated with one or more elements of context, composed context or analyzed context. Charges may be associated with none. Context may be associated with one or more charges, or with none. Furthermore, the step of associating context may be responsive to a time of day, a time of event of interest, a location of event of interest, a location of entity, a source of context, and/or an entity associated with context.

In step 340, methodology 300 evaluates the user entries in light of the context. Confidence in user entries may be increased, decreased or untouched by the information provided by the context. Such evaluation may be done via algorithm, table or data look up, previous specification, manually via user examination (e.g., show the user the relevant context streams and request confirmation). In our example, a charge for x-ray should be associated with a proximity of the patient to the x-ray on that date. If no proximity had been recorded, doubt is cast on the charge. If proximity was recorded and no charge was present, doubt is cast on the lack of charge. In one embodiment, user entries must be validated to be considered valid.

Thus, in general, evaluating user entries responsive to context may include a determination of validity, a determination of a likelihood of validity, a determination of a missing entry, and a determination of a missing element of an entry. Further, a defined workflow of correlated events may exist and the associated context uses the position in the workflow for determination. For example, a workflow may be defined for fulfilling a service contract which includes authorization, purchase of materials, and inspections. Purchase of materials, associated with location based context, which occurs at the wrong point of the workflow, may be precluded from association with the contract. In another example, medical procedures may be required to take place in a specific order. This workflow can be used in conjunction with context to identify missed charges.

In step 350, methodology 300 provides an indication of the evaluation performed in step 340. Such evaluation may be incremental, may occur once upon completion, and may be done locally or remotely. Results of the evaluation may be provided to the user that made the entry or to a third party. The indication may be, by way of example, a data message, an audible message, a visual message, an error message, an error log, a validation log, a confidence level. Methodology 300 ends at block 360.

Figure 4:
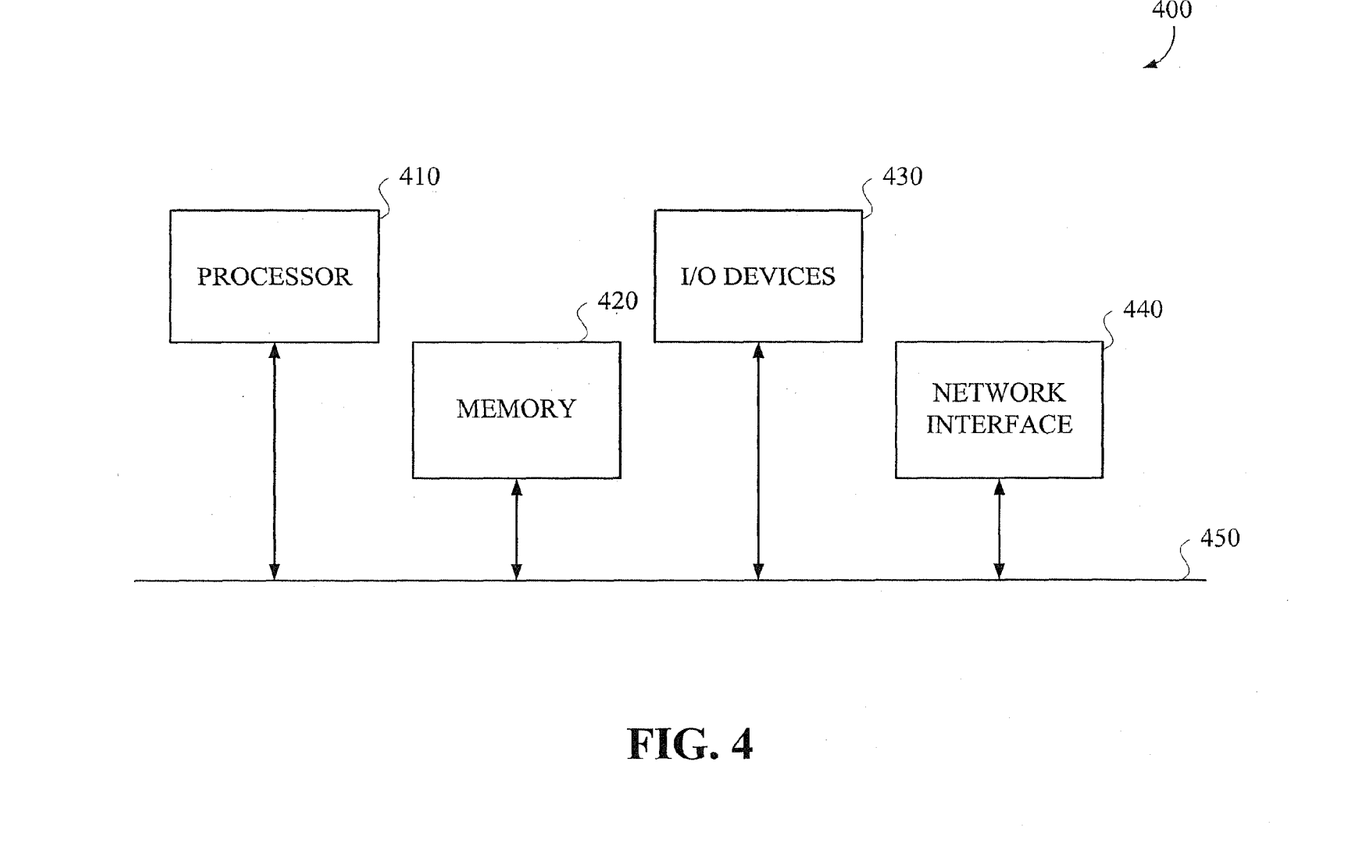
FIG. 4 is a block diagram illustrating a computer system suitable for implementing a user data entry system, according to an embodiment of the present invention.

Referring now to FIG. 4, a block diagram illustrates a computer system in accordance with which one or more components/steps of a user data entry system (e.g., components/steps described in the context of FIGS. 2 and 3) may be implemented, according to an embodiment of the present invention. For example, the illustrative architecture of FIG. 4 may be used in implementing any and all of the components of data stores 230, 240, 275 and 290, reconciliation engine 250, context service 270, and pattern miner 280 (as shown in FIG. 2). Also, the illustrative architecture of FIG. 4 may also be used in implementing any and all of the computing devices 205, 210, 215, 220, 245 and 260 (as shown in FIG. 2).

Further, it is to be understood that the individual components/steps may be implemented on one such computer system, or more preferably, on more than one such computer system. In the case of an implementation on a distributed system, the individual computer systems and/or devices may be connected via a suitable network (e.g., the Internet or World Wide Web). However, the system may be realized via private or local networks. The invention is not limited to any particular network.

As shown, the computer system 400 may be implemented in accordance with a processor 410, a memory 420, I/O devices 430, and a network interface 440, coupled via a computer bus 450 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

It is to be further appreciated that the present invention also includes techniques for providing user data entry services.

By way of example, a service provider agrees (e.g., via a service level agreement or some informal agreement or arrangement) with a service customer or client to provide user data entry services. That is, by way of one example only, the service provider may host the customer's web site and associated applications (e.g., medical billing application, e-commerce application, etc.). Then, in accordance with terms of the contract between the service provider and the service customer, the service provider provides user data entry services which may include one or more of the methodologies of the invention described herein. By way of example, this may include automatically validating user data entries based on a context stream so as to provide one or more benefits to the service customer. The service provider may also provide one or more of the context sources used in the validations. For example, the service provider may provide location context, or electronic calendar services.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of processing one or more user entries in a user data entry system, comprising the steps of:

obtaining context data associated with one or more events of interest, wherein the context data comprises patterns of context data that are derived from mining stored context data associated with the one or more events of interest, wherein the events of interest are pre-specified events for which context data is collected and stored for use as validation data to validate and reconcile user entries of a user, wherein the context data comprises at least one of a proximity to a location, a proximity to a person, a proximity to a device, a proximity to a person satisfying a condition, and a proximity to a location during a specified time interval;

associating at least a portion of the obtained context data of the user with one or more user entries representing the one or more events of interest;

evaluating at least a portion of the one or more user entries responsive to at least a portion of the context data, wherein evaluating comprises reconciling the context data with the one or more user entries to determine whether a user entry is valid, determine a likelihood that a user entry is valid, determine whether a user entry is missing and determine whether an element of a user entry is missing, in connection with the one or more events of interest; and providing an indication of the evaluation, wherein the steps of obtaining, associating, evaluating, and providing are implemented by a computer.

2. The method of claim 1, wherein the context data further comprises at least one of a location, a time at location, an application invocation, a duration of an application invocation, a duration of an application focus on a particular subject, an application invocation during a specified time interval, a user input, a duration of a user input session, a proximity to multiple persons and a location, a calendar, a work assignment, and a workflow stage.

3. The method of claim 2, wherein the location comprises a physical location.

4. The method of claim 3, further comprising the step of mapping a physical location onto a logical location.

5. The method of claim 2, wherein at least one of the proximities is determined in accordance with an identification device.

6. The method of claim 1, wherein context is obtained through at least one of a computer program, a file transfer, a batch mode, a communications network, a communications-enabled device, and a polling mechanism.

7. The method of claim 1, wherein context is obtained from one or more sources.

8. The method of claim 1, wherein context is obtained from at least one of a calendar, a global positioning system, user entry, a video, a sensor associated with a person, a sensor not associated with a person, and a proximity to a wireless access point.

9. The method of claim 1, wherein the step of associating context is responsive to at least one of a time of day, a time of event of interest, a location of event of interest, a location of entity, a source of context, and an entity associated with context.

10. The method of claim 1, wherein a workflow exists and at least one of the determinations comprises determining at least one workflow stage, the at least one workflow stage being associated with at least one context.

11. The method of claim 1, wherein providing an indication comprises at least one of providing a log, an error message, a warning, a default entry, an amended entry, a new entry, a deleted entry, a workflow, an e-mail, and a notification.

12. The method of claim 1, wherein the evaluating step comprises the step of, responsive to at least two sources of context, creating a composed source of context.

13. The method of claim 12, wherein the composed source is created through a calculation.

14. The method of claim 1, further comprising the step of automatically correcting a missing or invalid user entry based on the context data.

15. Apparatus for processing one or more user entries in a user data entry system, comprising:
a memory; and
at least one processor coupled to the memory and operative to:
(i) obtain context data associated with one or more events of interest, wherein the context data comprises patterns of context data that are derived from mining stored context data associated with the one or more events of interest, wherein the events of interest are pre-specified events for which context data is collected and stored for use as validation data to validate and reconcile user entries of a user, wherein the context data comprises at least one of a proximity to a location, a proximity to a person, a proximity to a device, a proximity to a person satisfying a condition, and a proximity to a location during a specified time interval;
(ii) associate at least a portion of the obtained context data of the user with one or more user entries representing the one or more events of interest;
(iii) evaluate at least a portion of the one or more user entries responsive to at least a portion of the context data, wherein evaluating comprises reconciling the context data with the one or more user entries to determine whether a user entry is valid, determine a likelihood that a user entry is valid, determine whether a user entry is missing and determine whether an element of a user entry is missing, in connection with the one or more events of interest; and
(iv) provide an indication of the evaluation.

16. An article of manufacture processing one or more user entries in a user data entry system, wherein the article of manufacture comprises a physical machine readable storage medium containing one or more programs which when executed implement the steps of:
obtaining context data associated with one or more events of interest, wherein the context data comprises patterns of context data that are derived from mining stored context data associated with the one or more events of interest, wherein the events of interest are pre-specified events for which context data is collected and stored for use as validation data to validate and reconcile user entries of a user, wherein the context data comprises at least one of a proximity to a location, a proximity to a person, a proximity to a device, a proximity to a person satisfying a condition, and a proximity to a location during a specified time interval;
associating at least a portion of the obtained context data of the user with one or more user entries representing the one or more events of interest;
evaluating at least a portion of the one or more user entries responsive to at least a portion of the context data, wherein evaluating comprises reconciling the context data with the one or more user entries to determine whether a user entry is valid, determine a likelihood that a user entry is valid, determine whether a user entry is missing and determine whether an element of a user entry is missing, in connection with the one or more events of interest; and
providing an indication of the evaluation.

17. A method of providing a service for validating one or more user entries in a user data entry system, comprising the steps of:
a service provider providing a service to a customer which comprises:
obtaining context data associated with one or more events of interest, wherein the context data comprises patterns of context data that are derived from mining stored context data associated with the one or more events of interest, wherein the events of interest are pre-specified events for which context data is collected and stored for use as validation data to validate and reconcile user entries of a user, wherein the context data comprises at least one of a proximity to a location, a proximity to a person, a proximity to a device, a proximity to a person satisfying a condition, and a proximity to a location during a specified time interval;

associating at least a portion of the obtained context data of the user with one or more user entries representing the one or more events of interest;

evaluating at least a portion of the one or more user entries responsive to at least a portion of the context data, wherein evaluating comprises reconciling the context data with the one or more user entries to determine whether a user entry is valid, determine a likelihood that a user entry is valid, determine whether a user entry is missing and determine whether an element of a user entry is missing, in connection with the one or more events of interest; and providing an indication of the evaluation, wherein the steps of obtaining, associating, evaluating, and providing are implemented by a computer.

\* \* \* \* \*